United States Patent [19]

Salmre

[11] 4,359,744

[45] Nov. 16, 1982

[54] INK JET PRINTER WITH PERISTALTIC PUMP

[75] Inventor: William Salmre, Norwalk, Conn.

[73] Assignee: Exxon Research and Engineering Co., Florham Park, N.J.

[21] Appl. No.: 203,584

[22] Filed: Nov. 3, 1980

[51] Int. Cl.³ ........................ G01D 9/32; G01D 15/16

[52] U.S. Cl. ................................ 346/1.1; 346/140 R

[58] Field of Search .......................... 346/1.1, 140, 75; 417/477

[56] References Cited

U.S. PATENT DOCUMENTS

| | | | |
|---|---|---|---|
| 2,693,766 | 11/1954 | Seyler | 103/149 |
| 2,917,002 | 12/1959 | Mascaro | 103/149 |
| 3,046,556 | 7/1962 | Summers et al. | 346/140 |
| 3,192,863 | 7/1965 | Vadot | 103/149 |
| 3,431,864 | 3/1969 | Jones, Jr. | 103/149 |
| 3,560,641 | 2/1971 | Taylor et al. | 346/75 X |
| 3,565,554 | 8/1969 | Muller | 417/477 |
| 3,771,165 | 11/1973 | Kurimoto et al. | 346/140 R |
| 3,790,703 | 2/1974 | Carley | 346/140 R X |
| 3,827,057 | 7/1974 | Bischoff et al. | 346/75 |
| 4,080,113 | 3/1978 | Legeay, nee Lechat et al. | 417/477 |
| 4,131,399 | 12/1978 | Calvet | 417/477 |

*Primary Examiner*—Donald A. Griffin

*Attorney, Agent, or Firm*—Norman L. Norris; Albert W. Preston, Jr.

[57] ABSTRACT

Ink jet apparatus of the impulse type employs one or more peristaltic pumps. The pumps comprise a flexible tube extending between the ink reservoir and the jet. One tube is constricted so as to advance ink from the reservoir to the jet. Another tube is constricted so as to create a vacuum and return ink from the jet to the reservoir.

15 Claims, 7 Drawing Figures

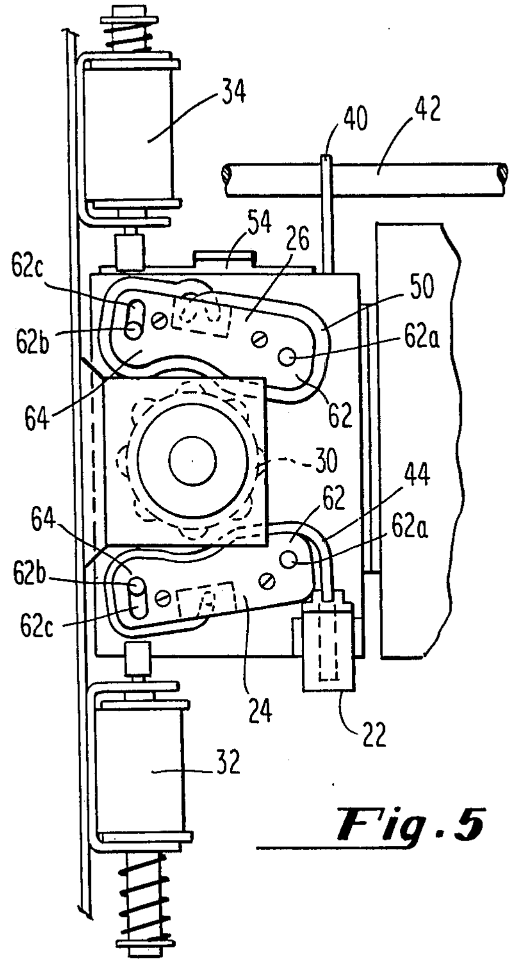
Fig. 5
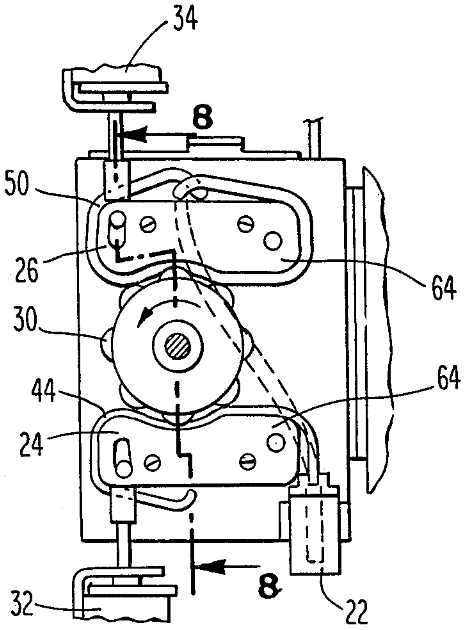
Fig. 6
Fig. 4
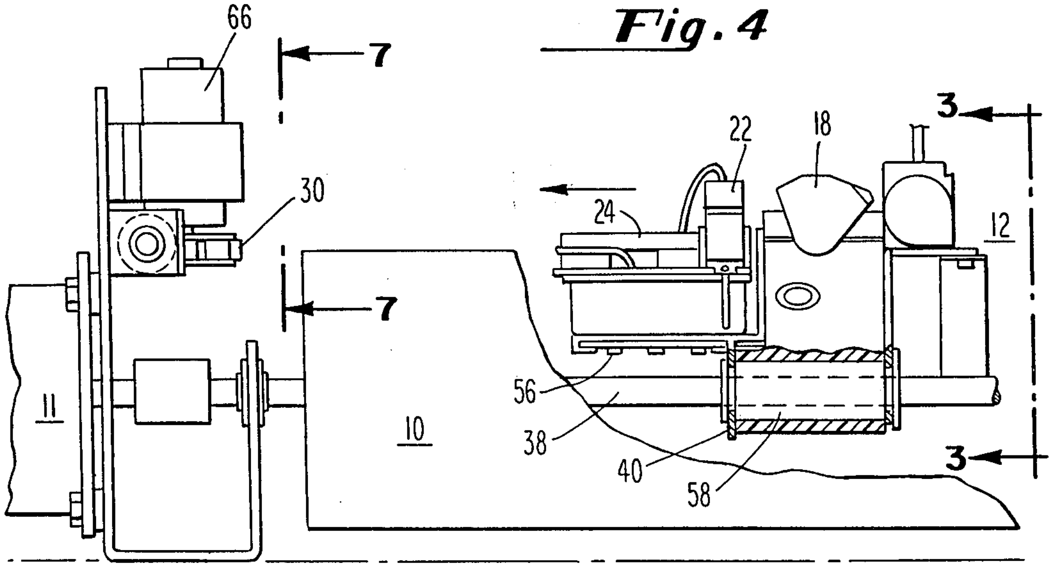

INK JET PRINTER WITH PERISTALTIC PUMP

FIELD OF THE INVENTION

This invention relates to ink jets which project droplets from an orifice for marking on a copy medium for use in a facsimile system or other ink jet printing systems.

BACKGROUND OF THE INVENTION

Ink jets commonly employ a transducer associated with a chamber adjacent the orifice such that the volume of the chamber is contracted and expanded in response to the state of energization of the transducer.

In a continuous ink jet, a constant flow of ink under pressure by means of a suitable pump so as to produce a constant flow of ink to the chamber wherein the contraction and expansion of the chamber interrupts the continuous flow of ink so as to break up a stream of ink flowing from the orifice into individual droplets. The individual droplets are either projected toward the copy medium or deflected into a catcher. p In an impulse ink jet, droplets of ink are only projected from the orifice on demand, i.e., droplets are projected only when the transducer is energized or deenergized depending upon the configuration of the ink jet. Although no pump is utilized in an impulse ink jet to maintain a stream of ink under pressure as in the case of the continuous ink jet, a pump may still be required during priming so as to provide the chamber of the impulse ink jet with an adequate supply of ink. In addition, a pump may be utilized in an impulse ink jet for purging, i.e., clearing the jet of any dry ink or other debris which might interfere with the projection of droplets from the orifice. It may also be desirable to provide a catcher in an impulse ink jet and associated pumping means for producing subatmospheric pressure at the catcher in accordance with the invention of copending application Ser. No. 203,582 filed Nov. 3, 1980.

From the foregoing, it will be appreciated that different requirements may be imposed on pumps utilized in ink jet applications. For example, in the case of priming, it is desirable to have the capability to meter out a predetermined amount of ink. Metering may also be important in purging in addition to sufficiently high pressure to relieve a clogged nozzle condition. Of course, all of this must be done with reliability.

Another requirement as set forth in copending application Ser. No. 203,583 filed Nov. 3, 1980 is disposability of at least a portion of the ink jet system for ease of operator maintenance. If the pump itself is to be disposable with the rest of the system, it must of course be relatively inexpensive. Additionally, it is desirable that any portion of the pump which is not disposable be easily interfaced with the disposable system. It is further desirable to minimize the risk of contaminating the ink supply.

SUMMARY OF THE INVENTION

It is an object of this invention to provide an ink jet system including a pump capable of metering out predetermined quantities of ink as required, for example, during an ink jet priming.

It is a further object of this invention to provide an ink jet system including a pump which is reliable.

It is a still further object of this invention to provide an ink jet system including a pump which lends itself to disposability of at least a portion of the system.

It is a more specific object of this invention to provide an ink jet system including a pump which facilitates interfacing of the disposable portions of the ink jet system with the nondisposable or permanent portions of the ink jet system.

It is a still further specific object of this invention to provide an ink jet system including a pump which permits disposability of a portion of the ink jet system while permitting the ink supply system to remain closed so as to prevent contamination.

It is yet another specific object of this invention to provide an ink jet system including a pump which reduces the expense associated with a disposable ink supply system.

In accordance with these and other objects of the invention, a preferred embodiment of the invention comprises an ink jet including an orifice adapted to project droplets of ink therefrom. A chamber is coupled to the orifice and a transducer communicates with the chamber to change the volume of the chamber and project droplets in response to the change. An elongated coupling means connects an ink supply to the chamber. The elongated coupling means includes a passageway which is progressively constricted by peristaltic means cooperating with the coupling means.

In accordance with one important aspect of the invention, the peristaltic means is adapted to move into and out of engagement with the coupling means. The coupling means creates capillary action drawing the ink from the supply to the ink jet when the peristaltic means has moved out of engagement with the coupling means.

The peristaltic means comprises a support means supporting the coupling means and the traveling constricting means moving relative to the elongated means. The constricting means may comprise a roller moving in a closed pass so as to engage and reengage the coupling means. The support means may be curved.

In a particularly preferred embodiment of the invention, the ink jet apparatus is incorporated in a facsimile system for reproducing dark/light variations on a copy medium. In this embodiment, the ink jet, the ink supply and the elongated coupling means are disposable and interface with the traveling constricting means which is not disposable.

BRIEF DESCRIPTION OF THE DRAWINGS

The invention will be better understood if reference is made to the accompanying drawing in which.

Figure 1:
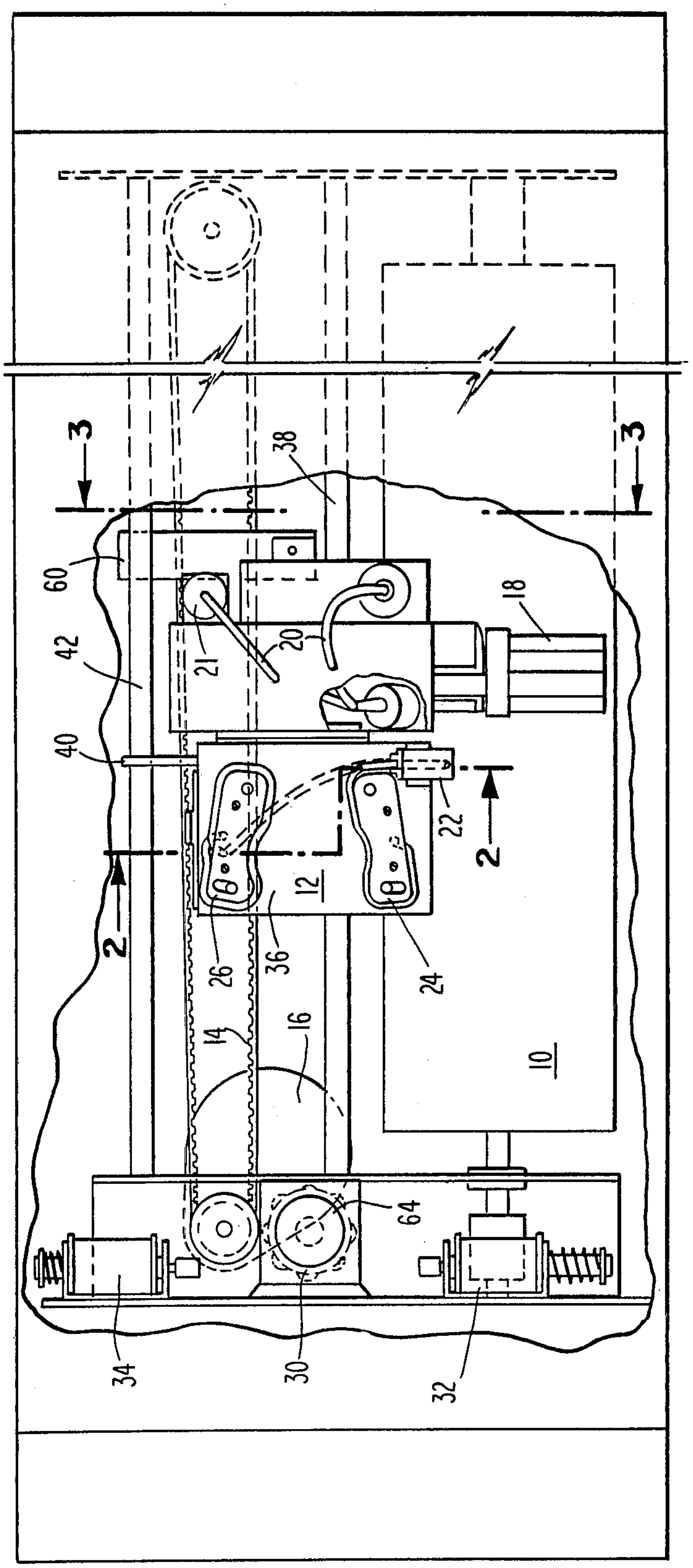
FIG. 1 represents an overall plan view of a facsimile transceiver comprising disposable ink jet apparatus according to the invention.
Figure 3:
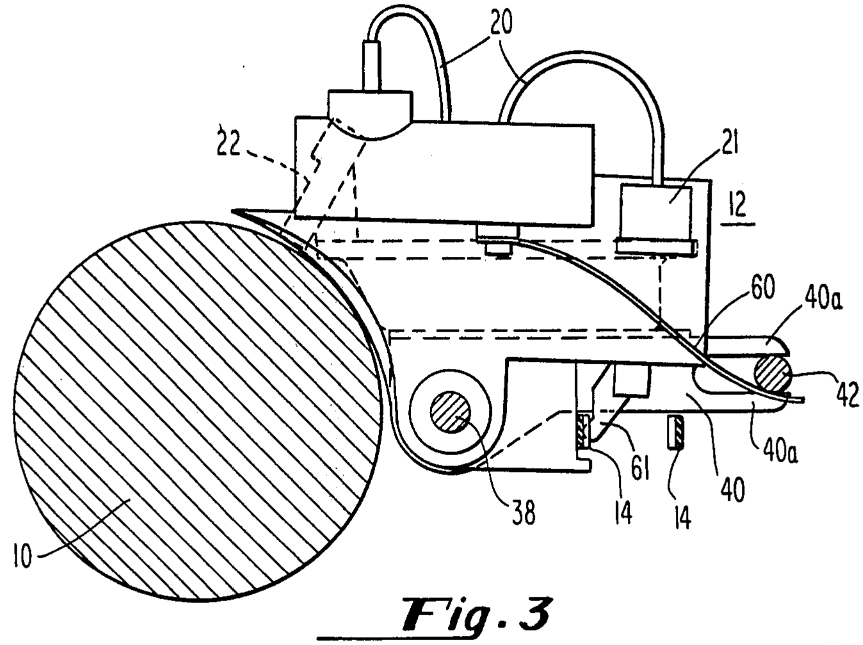
Figure 7:
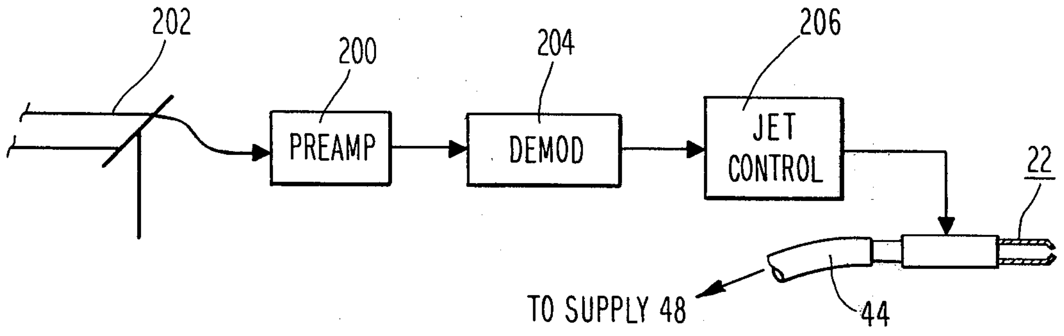

FIG. **2*a*** is a cross-section of a portion of a facsimile apparatus representing an alternative embodiment of the invention;

FIG. 3 is another cross-sectional view of a portion of the facsimile apparatus of FIG. 1 taken along the line 3—3 of FIG. 3;

FIG. 4 is a side view of a portion of the facsimile apparatus of FIG. 1;

FIG. 5 is an enlarged plan view of a portion of the apparatus shown in FIG. 1;

FIG. 6 is similar to FIG. 5, but in which the priming and vacuum pumps are shown in an energized position; and FIG. 7 is a block diagram of a facsimile receiver embodying the invention.

DETAILED DESCRIPTION OF A PREFERRED EMBODIMENT

Referring now to FIG. 1, an overall plan view is shown of facsimile apparatus comprising ink jet apparatus embodying the invention. In broad terms, the facsimile transceiver typically comprises a drum such as shown at 10 in FIG. 1 which is rotated while a read/write head generally indicated at 12 moves or scans in a direction parallel to the axis of the drum thus covering the whole expanse of a copy medium or a piece of paper supporting by or wrapped around the drum 10. In the embodiment shown, the head 12 is moved axially with respect to the drum 10 by means of a toothed belt 14 driven by a motor 16. The head 12 may be attached to the belt by a clamp which will be subsequently described.

The head 12 includes a knob 18 which controls the head function or mode; i.e., reading or writing. In the reading mode, fiber optics 20 provide a source of illumination for a document and pick-up dark/light variations in the document. The dark/light variations in the document are used to generate signals which are modulated and transmitted to a remote receiver at a distance.

In accordance with the invention of copending application Ser. No. 203,583 filed Nov. 3, 1980, the electrostatic stylus of the prior art facsimile units has been replaced by a disposable ink jet 22 mounted on a carrier 23. In accordance with this invention, the ink jet 22 is supplied with ink for priming and purging purposes by a first pump 24 of the peristaltic type. The ink jet apparatus is additionally provided with a second peristaltic pump 26 for providing subatmospheric pressure in the vicinity of the jet at start up of the unit, so as to provide a catcher for ink including any dust, dried ink or other debris which may be in the vicinity of the orifice of the jet 22. In accordance with the aforesaid copending application Ser. No. 203,583 filed Nov. 3, 1980, the peristaltic pumps 24 and 26 are driven by a single motive means in the form of a roller wheel 30 when the head 12 is at the far left. In accordance with copending application Ser. No. 203,589 filed Nov. 3, 1980 the peristaltic pumps 24 and 26 are individually actuated by means of solenoids 32 and 34, respectively as later described in more detail. The pumps 24 and 26 are mounted on the reservoir 36.

Figure 2:
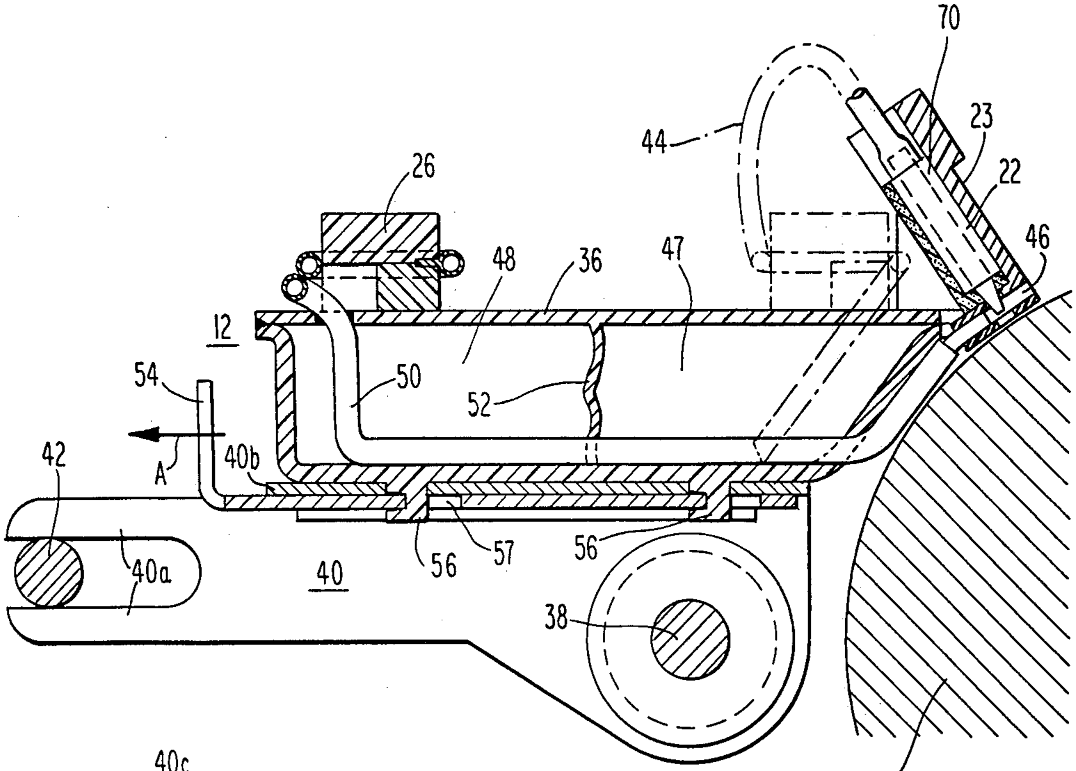
FIG. 2 is a cross-section of the portion of the facsimile apparatus representing an alternative embodiment of the invention.

Referring now to FIG. 2, the ink jet apparatus is shown in more detail. There, it will be observed, the ink jet 22 is in close proximity to a rotating drum 10 to which a copy medium may be attached for purposes of making a copy. The head 12 may move back and forth with respect to the drum 10 on a rod 38 and the distance of the jet 22 from the drum 10 may be controlled by means of a yoke 40*a* interacting with a second guide rod 42 thus allowing the bracket 40 on which the head 12 is mounted to pivot around the rod 38. When it is desired to begin operation of the ink jet 22, the pump may be energized, causing ink to travel through elongated coupling means comprising a tube 44 to ink jet 22. Thereafter, the thus-primed ink jet will remain full of ink by means of capillary action. The same operation for a longer duration will also tend to purge any foreign matter from the jet 22. The pump 24 therefore need only be energized periodically, e.g., at the beginning of each document transmission.

In accordance with the aforesaid copending application Ser. No. 203,582 filed Nov. 3, 1980 a vacuum region or catcher 46 is provided in the vicinity of and adjacent the orifice of the jet 22 and subatmospheric pressure is created by means of the second pump 26. In this way, any extra ink or debris expelled from the ink jet 22 during the priming and purging operation described above will be collected through coupling means comprising a second elongated coupling means in the form of a tube 50 and can be returned to a second or return section 48 of the reservoir 36.

In further accordance with the aforesaid application Ser. No. 203,583 filed Nov. 3, 1980, a first or supply section 47 of the reservoir 36 is separated from a second or return section 48 by a wall 52. The wall or membrane may be movable or flexible so as to allow an increase in the supply section 47 to compensate for a decrease in the return section 48 and vice versa. This reduces the chances that air bubbles will form in the ink supply systems so as to assure proper operation of the jet. Note that the wall 52 is relatively flexible as compared with the relatively rigid container of the reservoir 36.

The reservoir 36 is itself carried by the head 12 so as to permit mounting and removing of the reservoir 36 from the head 12. This is accomplished by providing a plurality of notched stubs 56 which may be formed integrally with the bottom of the reservoir 36 and adapted to interact with a slidable bracket 54 which, in turn, is held in place by a flange 40*b* of the bracket 40. When the bracket 54 is moved in a direction indicated by an arrow A, opening 57 in the slidable bracket 54 will release the notched stubs 56 so as to permit removal of the reservoir 36. During mounting, the bracket 54 is slid in the opposite direction so as to lock the notched stubs 56 in place. This is of course of the utmost importance to assure that a reservoir 36 and hence the ink jet 22 which is mounted on and carried by the reservoir 36 are properly located with respect to the drum 10 so as to assure proper drop placement.

Figure 2A:
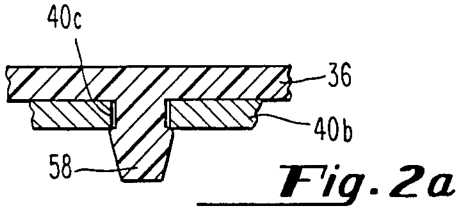

An alternative means to permit mounting and removing of the reservoir 36 from the head 12 is shown in FIG. 2*a*. Stubs 58 are formed integrally with the reservoir 36 and are adapted to form a force fit in openings 40*c* with the bracket 40*b*. The stubs 58 which have slightly enlarged heads as compared with the openings 40*c* may then be snapped into and out of the bracket 40*b* without movement of the type shown in FIG. 2 so as to permit the reservoir 36 of the ink jet apparatus associated therewith to be mounted and removed on the head 12 as a unit.

Although no electrical connections to the transducer 70 have been disclosed, it will be appreciated that such electrical connections may be provided on the bottom of the reservoir 36 such that the connection of the transducer 70 is essentially automatic when mounting the reservoir 36.

Referring now to FIG. 3, certain additional details of the apparatus of the invention are shown. Many of details shown in FIG. 3 are disclosed in U.S. Pat. No. 3,956,587 incorporated herein by reference. Specifically, FIG. 3 shows fiber optics 20 which are used for transmitting illumination onto a region of the medium being scanned (when the facsimile transceiver is used for transmission purposes) and a second fiber optic used to pick-up dark/light variations of the document to be copied. Also shown in FIG. 3 is the rod 38 on which the read/write head 12 moves, the rod 42 which locates the angular position of the read/write head 12 with respect to the drum and a leaf spring 60 which serves to keep the read/write head properly positioned with respect to the drum. The belt 14 used to drive the read/write head back and forth with respect to the drum 10 is also shown in FIG. 3 as is the clamp 61 used to secure the read/write head to the belt; the ink jet 22 is shown in phantom.

Reference will now be made to FIGS. 4, 5 and 6 for a more detailed description of a number of important aspects of this invention. As discussed above, the pumps 24 and 26 are peristaltic pumps which are of the type wherein progressive compression or constriction of a resilient tube is used to generate variations in pressure within the tube which can be used for pumping. This compression substantially closes or constricts the passageway within the interior of the tubes 44 and 50 along a substantial length thereof so as to induce a pressure differential across the ends of the tube 44 and 50. In the preferred embodiment, the first pump 24 is activated to force ink through the ink jet 22 prior to printing so as to prime and purge the ink jet 22 and a second pump 26 is activated to provide a vacuum in the vicinity of the orifice of the jet 22 so as to collect ink including any dust or debris. As shown perhaps most clearly in FIGS. 5 and 6, the roller wheel 30 is used to compress the tubes of the pumps 24 and 26 against blocks 64 at curved surfaces 65 when the head 12 is in the left handmost position. The wheel 30 is rotated as shown in FIG. 6 such that the rollers on the wheel 30 travel or advance to provide progessive compression of the tubes, causing the desired pumping action. The two pumps are shown as comprising tube blocks 64 around which the tubes are wrapped which may be pivoted, under the action of solenoids 32 and 34, to bring the rollers of the wheel into and out of engagement with the tubes 44 and 50. In this way, the two pumps are individually controllable. When a motor 66 (FIG. 4) is energized, it spins the roller wheel 30. Then if either of the solenoids 32 or 34 are energized, the pivoted blocks 64 are forced into the wheel thus compressing the tubes 44 and 50. The preferred sequence of operations is energize the solenoid 34, and thus activate the pump 26, thus providing subatmospheric pressure in the vicinity of the orifice of the jet 22, and to energize solenoid 32 and hence activate pump 24 to force ink from the reservoir 36 through the ink jet 22. Any ink thus ejected from the jet 22 would be collected, along with any dust or debris in the pump 26 and returned to the part 47 of the reservoir 48 (FIG. 2). The pump 24 is then deactivated by deenergizing the solenoid 32 and the pump 26 is deactivated by deenergizing the solenoid 34.

Referring to FIG. 7, the ink jet 22 as shown is coupled to a circuitry for controlling the ink jet. More particularly, FIG. 7 shows a preamplifier circuit 200 coupled to a communications link such as a telephone line 202. The output of the preamplifier is coupled to a demodulator or a decoder 204 of information bearing signals representing dark/light variations in a remotely located document. The output from the demodulator is coupled to a jet control signal generator 206 capable of generating print commands for the ink jet 22.

A number of the details concerning the peristaltic pumps 24 and 26 are disclosed in the aforesaid applications Ser. No. 203,598 filed Nov. 3, 1980 and Ser. No. 203,583 filed Nov. 3, 1980 and these applications are therefore incorporated herein by reference. In addition, details concerning the catcher 46 are disclosed in copending application Ser. No. 203,582 filed Nov. 3, 1980 which is also incorporated herein by reference.

While preferred embodiments of the invention have been shown and described, it will be understood that they are exemplary only, and that true spirit and scope of the invention, is set forth in the appended claims.

What is claimed is:

1. Ink jet apparatus comprising:
an ink jet including an orifice adapted to project droplets of ink therefrom, a chamber coupled to said orifice and a transducer communicating with said chamber to change the volume of said chamber and project droplets in response to said change;
an ink reservoir;
an elongated and flexible capillary coupling means having a passageway connecting said ink jet and said reservoir; and
peristaltic means cooperating with said coupling means to create a constriction therein and advance said constriction along a length of said coupling means.

2. The ink jet apparatus of claim 1 wherein said peristaltic means is adapted to move into engagement during priming or purging and out of engagement while projecting droplets.

3. The ink jet of claim 1 wherein said peristaltic means comprises a support means supporting said coupling means and traveling constricting means movable relative to said coupling means.

4. The ink jet of claim 3 wherein said restricting means comprises a roller moving in a closed path so as to engage and disengage the coupling means.

5. The ink jet of claim 3 wherein said support means comprises a curved supporting surface.

6. A facsimile system comprising:
copy medium support means for supporting a copy medium during scanning;
scanning head means movable with respect to said support means so as to create a relative scanning motion between said head and said support means;
ink jet means including an orifice adapted to project droplets of ink therefrom, a chamber coupled to said orifice and a transducer coupled to said chamber to change the volume of said chamber and project droplets in response to said change;
an ink reservoir;
an elongated and flexible capillary coupling means having a passageway connecting said ink jet and said reservoir; and
peristaltic means cooperating with said coupling means to create a constriction therein and advance said constriction along a length of said coupling means.

7. The facsimile system of claim 6 wherein said peristaltic means is adapted to move into engagement during priming or purging and out of engagement with said coupling means while projecting droplets.

8. The facsimile system of claim 6 wherein said peristaltic means comprises a support means supporting said coupling means and travelling constriction means movable relative to said coupling means.

9. The facsimile system of claim 8 wherein said constricting means comprises a roller moving in a closed path so as to engage and disengage the coupling means.

10. The facsimile system of claim 8 wherein said support means comprises a curved supporting surface.

11. A method of operating an ink jet apparatus comprising an ink jet having an orifice, a chamber coupled to said orifice and a transducer coupled to said chamber so as to change the volume of said chamber and project droplets from said orifice, an ink reservoir and coupling means having a flexible passageway connecting said reservoir to said ink jet, said method comprising the following steps:

constricting said flexible passageway;

advancing a constriction along said coupling means until said chamber is filled;

removing the constriction after the chamber is filled;

ejecting droplets of ink from said orifice after the chamber is filled; and flowing ink through the passageway while ejecting droplets by capillary action.

12. The method of claim 11 including the step of removing said constriction after said chamber is filled.

13. The method of claim 11 wherein the volume of the chamber is changed so as to project droplets from said orifice.

14. The method of claim 11 wherein said constricting is accomplished by rolling a member along said coupling means.

15. The method of claim 14 wherein said removing said constriction comprises separating said member from said coupling means.

* * * * *